United States Patent
Selvaraj et al.

(10) Patent No.: US 11,025,570 B2
(45) Date of Patent: Jun. 1, 2021

(54) DYNAMIC AND SECURE REAL-TIME NOTIFICATIONS IN MESSAGES

(71) Applicant: Microsoft Technology Licensing, LLC, Redmond, WA (US)

(72) Inventors: Naveenkumar Selvaraj, Mountain View, CA (US); Sagar Gala, Milpitas, CA (US); Aaron Choe Salls, San Francisco, CA (US); Min Kyung Kim, Sunnyvale, CA (US); Brad Christopher Ciraulo, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 15/851,538

(22) Filed: Dec. 21, 2017

(65) Prior Publication Data

US 2019/0199665 A1 Jun. 27, 2019

(51) Int. Cl.
*G06F 15/16* (2006.01)
*H04L 12/58* (2006.01)
*G06Q 10/10* (2012.01)
*G06F 16/58* (2019.01)
*G06Q 50/00* (2012.01)

(52) U.S. Cl.
CPC .......... *H04L 51/10* (2013.01); *G06F 16/5866* (2019.01); *G06Q 10/107* (2013.01); *H04L 51/046* (2013.01); *H04L 51/24* (2013.01); *H04L 51/32* (2013.01); *G06Q 50/01* (2013.01)

(58) Field of Classification Search
CPC .............................. H04L 51/10; H04L 51/046
See application file for complete search history.

(56) References Cited

U.S. PATENT DOCUMENTS

| | | | |
|---|---|---|---|
| 2002/0010757 A1* | 1/2002 | Granik | G06F 16/955 709/218 |
| 2007/0078904 A1* | 4/2007 | Yoon | G06F 16/958 |
| 2016/0034973 A1* | 2/2016 | Soni | G06Q 30/0276 705/14.66 |
| 2017/0148056 A1* | 5/2017 | Hata | G06F 16/9535 |

* cited by examiner

*Primary Examiner* — Hua Fan
(74) *Attorney, Agent, or Firm* — Schwegman Lundberg & Woessner, P.A.

(57) ABSTRACT

Techniques for providing dynamic and secure real-time notifications in messages are disclosed herein. In some embodiments, a method comprises: storing a count of notifications associated with a user; transmitting a message to a messaging client of a device of the user, the message being configured to trigger the messaging client to transmit a request in response to the message being opened; updating the count of notifications after the transmission of the message; receiving the request from the messaging client based on the message having been opened; in response to receiving the request, determining the changed count of notifications; retrieving an image from a database of images based on the changed count of notifications, the image indicating the changed count of notifications; and transmitting the image to the messaging client for display in the opened message.

20 Claims, 11 Drawing Sheets

DYNAMIC AND SECURE REAL-TIME NOTIFICATIONS IN MESSAGES

TECHNICAL FIELD

The present application relates generally to electronic messaging and, in one specific example, to methods and systems of providing dynamic and secure real-time notifications in messages.

BACKGROUND

Electronic messages, such as e-mail messages, sometimes contain content that becomes outdated by the time a user views them. For example, an e-mail message to a user may contain content representing a social network website to which the recipient of the e-mail message belongs. Because events related to this information may continue to occur after the e-mail message is transmitted to the recipient, the original information included in the e-mail message may become stale or outdated. Furthermore, the path to an effective solution to this technical problem is a difficult one, given the limitations of Hypertext Markup Language (HTML) and Cascading Style Sheets (CSS), as well as the tendency for e-mall servers to use a cache to retrieve certain content when displaying that content in a message when the message opened and viewed by a user, thereby creating a technical obstacle in the way of the computer system that generated and sent the message performing a dynamic update of the content in the message.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
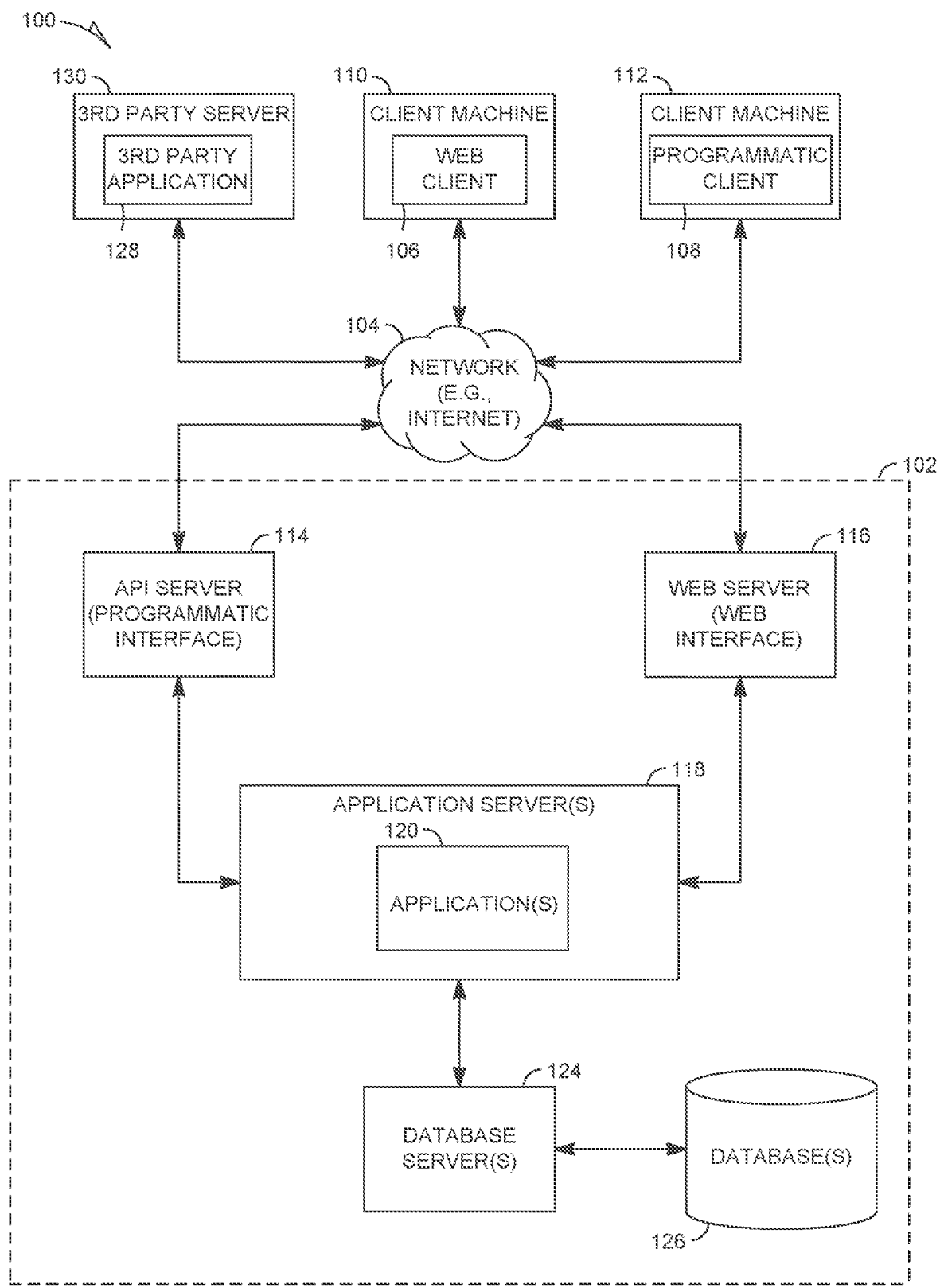
FIG. 1 is a block diagram illustrating a client-server system, in accordance with an example embodiment.

Example methods and systems of providing dynamic and secure real-time notifications in messages are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to enable a computer system to provide dynamic and secure real-time notifications in messages, overcoming the limitations of technologies such as HTML and CSS and the obstacles created by the tendency for e-mail servers to use a cache. Additionally, other technical effects will be apparent from this disclosure as well.

In some example embodiments, the computer system disclosed herein is configured to, after an electronic message is opened by a recipient of the electronic message, dynamically update the electronic message to indicate the current number of notifications that have been issued by an online service, such as a social networking service, by using a count of notifications to retrieve an image that indicates the current number of notifications at the time the electronic message is opened, and displaying the retrieved image in the message. However, it is contemplated that the features disclosed herein may be used to dynamically update other types of content of electronic messages as well.

In some example embodiments, operations are performed by a computer system (or other machine) having a memory and at least one hardware processor, with the operations comprising: storing a count of notifications associated with a user of an online service; transmitting a message to a messaging client of a computing device of the user via a network, the message being configured to trigger the messaging client to transmit an image request to the computer system in response to the message being opened, the count of notifications being at a first value when the message is transmitted to the messaging client; subsequent to transmitting the message to the messaging client, changing the count of notifications from the first value to a second value different from the first value; receiving the image request from the messaging client based on the message having been opened within the messaging client; in response to receiving the image request, determining the count of notifications to be the second value; retrieving an image from a database of images based on the second value of the count of notifications, the image indicating the second value of the count of notifications; and transmitting the retrieved image to the messaging client for display in the opened message.

In some example embodiments, the message comprises code configured to cause a messaging server of the messaging client to retrieve the image from the computer system every time the message is opened within the messaging client and not from a cache of the messaging server. In some example embodiments, the code comprises an image Uniform Resource Locator (URL) and at least one query parameter.

In some example embodiments, the operations further comprise: receiving, at a particular point in time, another image request from another messaging client of another computing device of another user, the other image request comprising an image URL included in the image request; in response to receiving the other image request, determining that the particular point in time is not within a predetermined amount of time since the message was transmitted to the messaging client; retrieving another image from the database of images not based on any value of the count of notifications, the other image not indicating any value of the count of notifications; and transmitting the retrieved other image to the other messaging client for display on the other computing device of the other user.

In some example embodiments, the message transmitted to the messaging client of the computing device of the user comprises a signature, and the operations further comprise: receiving another image request from another messaging client of another computing device of another user, the other image request comprising an image URL included in the image request and another signature; in response to receiving the other image request, determining that the other signature does not match the signature of the message; in response to the determining that the other signature does not match the signature of the message, retrieving another image from the database of images not based on any value of the count of notifications, the other image not indicating any value of the count of notifications; and transmitting the retrieved other image to the other messaging client for display on the other computing device of the other user.

In some example embodiments, the messaging client comprises an e-mail client and the message comprises an e-mail message. In some example embodiments, the count of notifications comprises a count of notifications that have not been viewed by the user. In some example embodiments, the notifications comprise at least one of: one or more notifications of an invitation to connect with another user via the online service; one or more reminders to perform an action via the online service; one or more notifications of messages sent to the user via the online service; one or more notifications of job opportunities; and one or more notifications about one or more other users of the online service with whom the user is connected via the online service.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g. a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
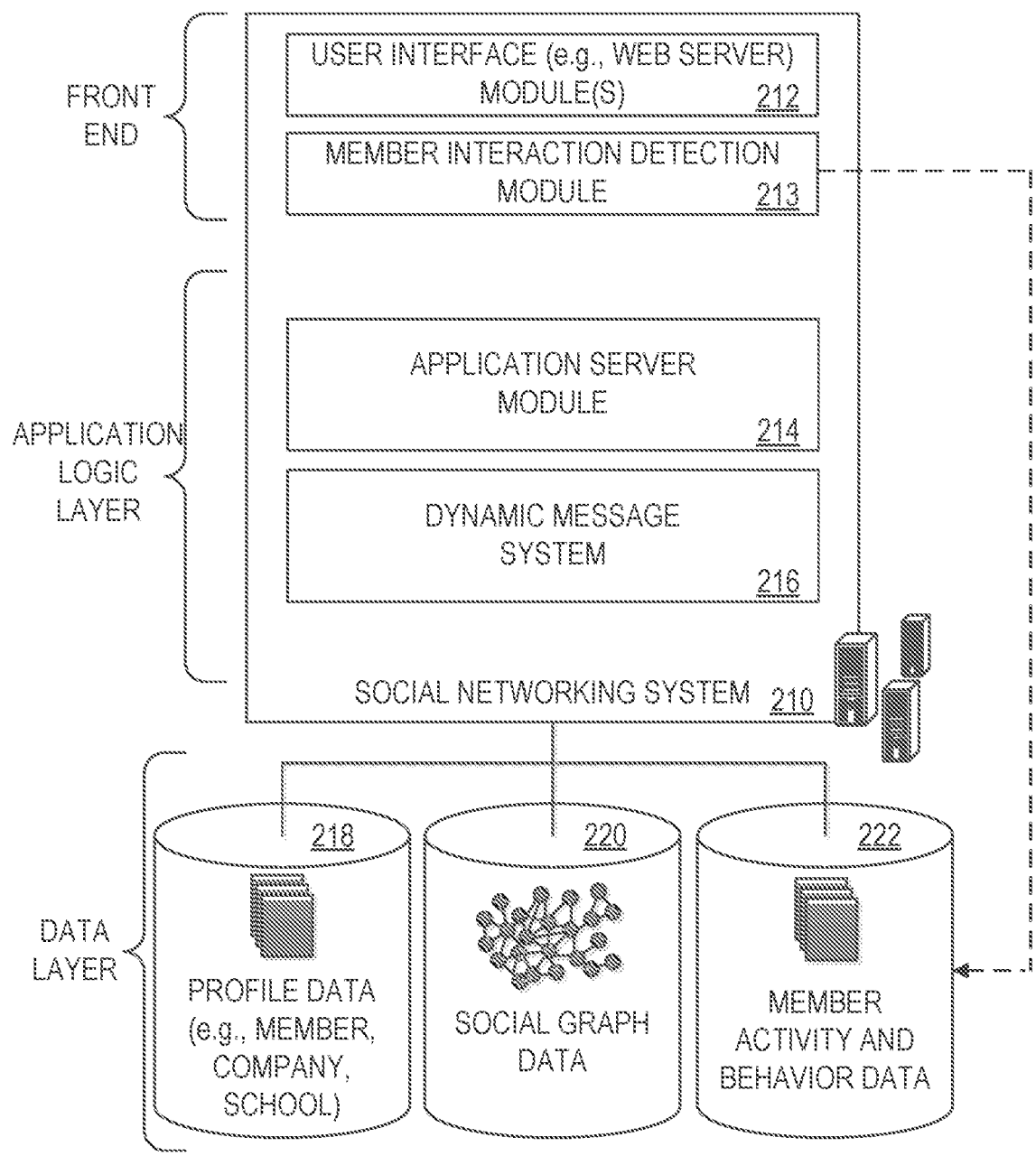
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a dynamic message system 216, for use in social networking system 210, consistent with some embodiments of the present disclosure. In some embodiments, the dynamic message system 215 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the dynamic message system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various, job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service other than data privacy concerns, nothing prevents the API from being provided to the public or to certain third-parties under special arrangements, thereby making the navigation recommendations available to third party applications and services.

Although the dynamic message system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
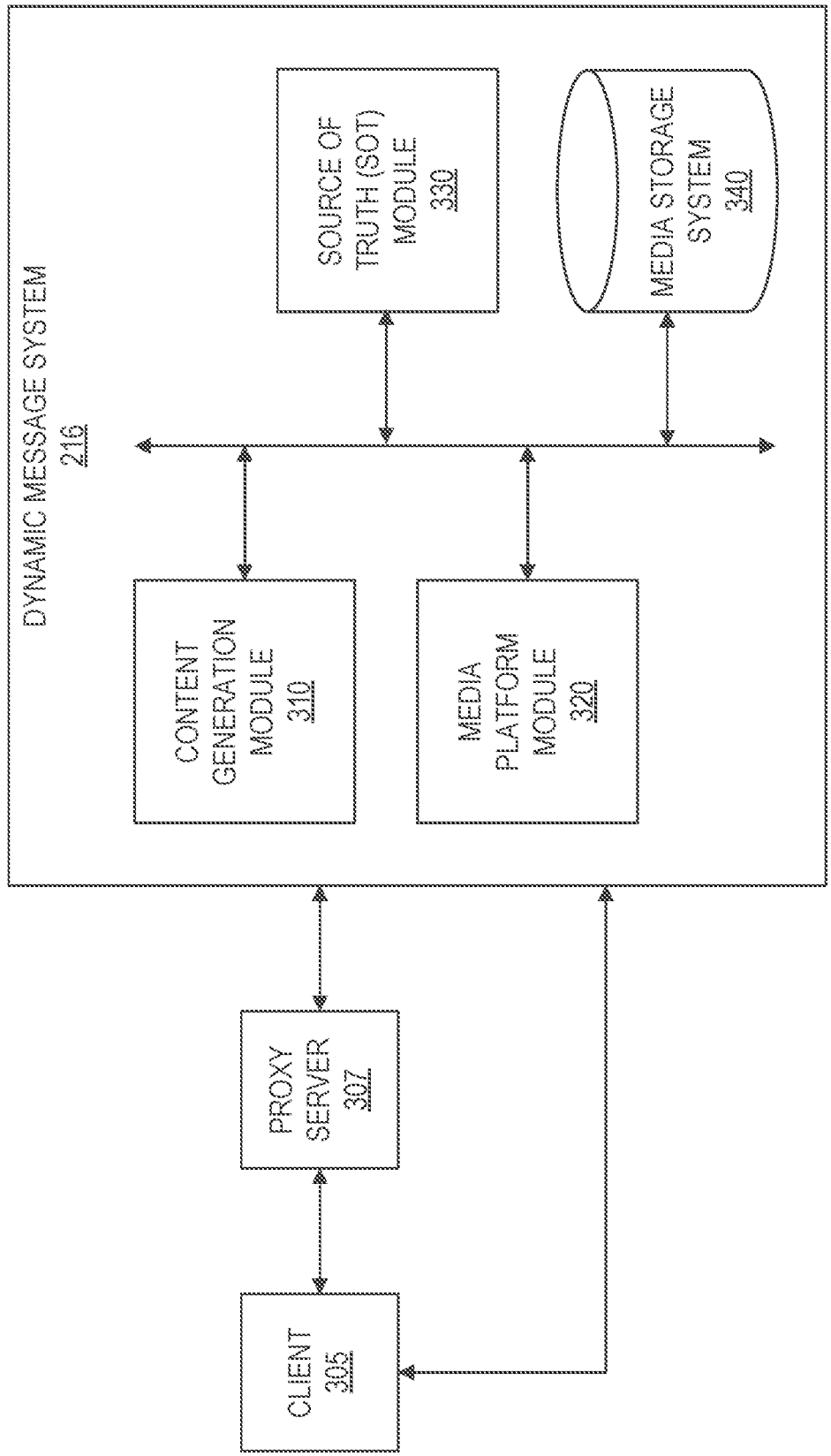
FIG. 3 is a block diagram illustrating components of a dynamic message system, in accordance with an example embodiment.

FIG. 3 is a block diagram illustrating components of the dynamic message system 216, in accordance with an example embodiment. The dynamic message system 216 may generate and transmit a message, via a network (e.g., network 104 in FIG. 1) to a messaging client 305 on a computing device of a user (e.g., client machine 110 or client machine 112 in FIG. 1). The message may comprise content that is configured to indicate to the user, upon the user opening the message, the number of notifications that have been issued by an online service, such as a count of the notifications a social networking service (e.g., social networking system 210 in FIG. 2) has directed towards the user, who may be a member of the social networking service. The count of notifications may be a count of the notifications that have been issued but not yet opened or viewed by the user. The dynamic message system 216 may continuously keep track of the count of notifications. Since new notifications may be issued at any time one or more particular events (e.g., status updates, posting of opportunities, invitations to connect, etc.) occur on the online service, the count of notifications for the user may change after the message has been transmitted to the messaging client 305 and before the user has opened the message. The dynamic message system 216 prevents the display of an inaccurate count of notifications within the opened message by retrieving an image that indicates the count of notifications when the user opens the message and transmits the image to the messaging client 305 for display within the opened message.

In some embodiments, the dynamic message system 216 comprises any combination of one or more of a content generation module 310, a media platform module 320, a source of truth (SOT) module 330, and a media storage system 340 (e.g., one or more database). The modules 310, 320, and 330 and the storage system 340 can reside on a computer system, or other machine, having a memory and at least one processor (not shown). In some embodiments, the modules 310, 320, and 330 and the media storage system 340 can be incorporated into the application server(s) 118 in FIG. 1. In some example embodiments, the media storage system 340 is incorporated into database(s) 126 in FIG. 1 and can include any combination of one or more of databases 218, 220, and 222 in FIG. 2. However, it is contemplated that other configurations of the modules 310, 320, and 330, as well as the media storage system 340, are also within the scope of the present disclosure.

In some example embodiments, one or more of the modules 310, 320, and 330 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, and 330 is configured to receive user input. For example, one or more of the modules 310, 320, and 330 can present one or more GUI elements (e.g., drop-down menu, selectable buttons, text field) with which a user can submit input.

In some example embodiments, one or more of the modules 310, 320, and 330 is configured to perform various communication functions to facilitate the functionality described herein, such as by communicating with the social networking system 210 via the network 104 using a wired or wireless connection. Any combination of one or more of the modules 310, 320, and 330 may also provide various web services or functions, such as retrieving information from the third party servers 130 and the social networking system 210. Information retrieved by the any of the modules 310, 320, and 330 may include profile data corresponding to users and members of the social networking service of the social networking system 210.

Additionally, any combination of one or more of the modules 310, 320, and 330 can provide various data functionality, such as exchanging information with the media storage system 340 or servers. For example, any of the modules 310, 320, and 330 can access member profiles that include profile data from the media storage system 340, as well as extract attributes and/or characteristics from the profile data of member profiles. Furthermore, the one or more of the modules 310, 320, and 330 can access profile data, social graph data, and member activity and behavior data from the media storage system 340, as well as exchange information with third party servers 130, client machines 110, 112, and other sources of information.

In some example embodiments, the content generation module 310 is configured to generate a message, and to transmit the generated message to the messaging client 305 on a computing device of a user, such as via a messaging server (e.g., an e-mail server) with which the messaging client 305 communicates to load and display messages directed to the user. As used herein, transmitting a message to a messaging client 305 includes transmitting the message to the server of the messaging client 305, meaning that when the message has been transmitted by the dynamic message system 216 to the messaging server of the messaging client 305, the dynamic message system 216 has effectively transmitted the message to the messaging client 305.

In some example embodiments, the message comprises an e-mail message, and the messaging client 305 comprises an e-mail client. However, it is contemplated that other types of electronic messages and messaging clients 305 are within the scope of the present disclosure.

In some example embodiments, the message is configured to trigger the messaging client 305 to transmit an image request to the dynamic message system 216 in response to, or otherwise based on, the message being opened (e.g., opened within the messaging client 305 by the user). The image request may be transmitted from the messaging client 305 to the dynamic message system 216 via a proxy server 307 that is external to the dynamic message system 216. In some example embodiments, the image request comprises an image Uniform Resource Locator (URL). The image URL is an Internet address that pints to a specific image, webpage, website, or other source of an image that is to be retrieved.

In some example embodiments, the image request also comprises a token, which is an encrypted user identification (ID), and the proxy server 307 is configured to determine the decrypted user ID by performing a decryption operation on the token. The proxy server 307 may then transmit the user ID to the dynamic message system 216 as part of the image request.

In some example embodiments, the media platform module 320 is configured to receive the image request, and to determine the current value of the count of notifications corresponding to the user. The media platform module 320 may determine the current value of the count of notifications by retrieving the current value from the SOT module 330 using the user ID included in the image request.

In some example embodiments, the SOT module 330 is configured to store and manage the count of notifications corresponding to the user, such as by storing the count of notifications of the user in association with the user B) of the user. The SOT module 330 may receive indications of computing events occurring on the online service that cause an increase or decrease in the value of the count of notifications. For example, when the online service issues a notification about an invitation to connect for the user, the SOT module 330 may detect this issuance of the notification and increase the value of the count by one, whereas when the SOT module 330 detects that the user has opened or viewed one of the pending notifications issued to the user by the online service, the SOT module 339 may decrease the value of the count by one. Each such computing event on the online service that is related to the creation or consumption of a notification may be detected, or otherwise received, by the SOT module 330 and used by the SOT module 330 to increase or decrease the value of the count accordingly.

In some example embodiments, the notifications comprise at least one of: one or more notifications of an invitation to connect with another user via the online service, one or more reminders to perform an action via the online service, one or more notifications of messages sent to the user via the online service, one or more notifications of job opportunities, and one or more notifications about one or more other users of the online service with whom the user is connected via the online service. Other types of notifications are also within the scope of the present disclosure.

In some example embodiments, the value of the count comprises a first value at the time the message is transmitted from the dynamic message system 216 to the messaging client 305 of the user, and the value of the count is adjusted from the first value to a second value different from the first value after the message has been transmitted to the messaging client 305. The media platform module 320 may query the SOT module 330 for the current value of the count for the user, including the user ID in the query, and the SOT module 330 may then look up, or otherwise find, the current value of the count for the user based on the user ID. The SOT module 330 may then transmit the current value of the count back to the media platform 320 in response to the query by the media platform module 320 for the current value of the count.

In some example embodiments, the media platform module 320 is configured to retrieving an image from the media storage system 340 based on the current value of the count of notifications. The media storage system 340 may comprise a database of images from which the image may be retrieved. In some example embodiments, the media storage system 340 stores each image in association with an image ID. The media platform module 320 may select, or otherwise determine, an image ID based on the current value of the count of notifications. In some example embodiments, the media storage system 340 stores a plurality of count images, with each one of the count images indicating a different corresponding value of the count of notifications. For example, a first image stored by the media storage system 340 may correspond to and indicate a value of one for the count of notifications (e.g., representing that there is currently one pending notification for the user that has not been opened or viewed by the user), a second image stored by the media storage system 340 may correspond to and indicate a value of two for the count of notifications (e.g., representing that there are currently two pending notification for the user that has not been opened or viewed by the user), a third image stored by the media storage system 340 may correspond to and indicate a value of three for the count of notifications (e.g., representing that there are currently three pending notification for the user that has not been opened or viewed by the user), and so on and so forth.

The current value of the count of notifications for a user may continue to grow to an exceptionally large number over time (e.g., hundreds, thousands, etc.). As a result, the number of different images to correspond to all of the different values of the count can similarly grow to an exceptionally large number (e.g., hundreds, thousands, etc.). This possibility of having to use such a large number of images to handle every single possible value of the count creates a technical problem, as the storage of so many images consumes a large amount of storage space in the dynamic message system 216. Therefore, in order to reduce the consumption of storage space, in some example embodiments, the media storage system 340 stores a distinct image for each one of a plurality of count values up until a particular count value, such as storing a first image indicating a count value of one, a second image indicating a count value of two, a third image indicating a count value of three, and so on and so forth, up until a ninth image indicating a count value of nine. After the ninth image, the media storage system 340 may store a single image for the rest of the count values that are above nine (e.g., 10+).

In some example embodiments, the media platform module 320 is configured to query the media storage system 340 for the image corresponding to the image ID, including the image ID in the query, and the media storage system module 340 may then look up, or otherwise find, the corresponding image for the image ID. The media storage system 340 may then transmit the image back to the media platform 320 in response to the query by the media platform module 320 for the image. In some example embodiments, the media platform module 320 is configured to transmit the image to the messaging client 305 for display in the opened message, thereby causing the image indicating the current value of the count of notifications to be displayed in the opened message.

The dynamic message system 216 uses an image based on a count value to dynamically update the content of a message after the message has been transmitted, by retrieving the image at the time the message is opened, thereby overcoming the technical limitations of HTML and CSS commonly used in e-mail messages.

However, a technical problem arises in situations involving certain e-mail servers to which the email messages are transmitted for access by the corresponding messaging client 305. Certain email servers use the image URL in the e-mail message to fetch the corresponding image and store the fetched image in a local cache. These e-mail servers may then use the image stored in the cache for display in the message when the user opens the message, rather than retrieving the most relevant image based on the current value of the count of notifications. As a result, the dynamic real-time retrieval of content from the dynamic message system 216 may be blocked by such e-mail servers. However, the dynamic message system 216 offers a technical solution to this problem.

In some example embodiments, the content generation module 310 configures the message (e.g., an e-mail message) to comprise code configured to cause a messaging server of the messaging client 305 to retrieve the image from the dynamic message system 216 every time the message is opened within the messaging client 305 and not from a cache of the messaging server. In some example embodiments, the content generation module 310 inserts at least one query parameter into the code of the message, such as by adding the query parameter(s) to the image URL. For example, the code may comprise a concatenation of the image URL and the query parameter(s), such as:

http://www.linkedin.com/a/b/c.jpg?name=John_Doe,
where "?name=John_Doe" is a query parameter added to image URL http://www.linkedin.com/a/b/c.jpg. The inclusion of the query parameter(s) causes the messaging server to retrieve the most relevant image based on the current count value from the dynamic message system 216 each and every time the message is opened.

The dynamic message system 216 may also be configured to provide protection against users other than the intended or original recipient of the message (e.g., a hacker or someone who was forwarded the message from the original intended recipient) from being provided the image and thus being provided personal information of the intended recipient that may be indicated by the image. Such protection may comprise restricting the use of the images based on the current count value to situations in which the image request is received within a particular window of time (e.g., within 60 days of the message being transmitted to the messaging client 305), thereby preventing the use of the images based on the current count value in situations in which the message is opened at a time outside of the particular window of time.

In some example embodiments, the dynamic message system 216 receives, at a particular point in time, an image request from a messaging client 305 of a computing device of a user, and is configured to determine whether or not the particular point in time is within a predetermined amount of time since the message was transmitted to the messaging client 305, and retrieve a default image from a database of images that is not based on any value of the count of notifications in response to, or otherwise based on, a determination that the particular point in time is not within the predetermined amount of time. In some example embodiments, the default image does not indicate any value of the current count of notifications. The dynamic message system 216 may then transmit the retrieved default image to the messaging client 305 for display on the computing device of the user. It is contemplated that the user in this situation may be either the intended or original recipient of the message. In response to, or otherwise based on, a determination that the particular point in time is within the predetermined amount of time since the message was transmitted to the messaging client 305, the dynamic message system 216 may retrieve an image based on the current value of the count of notifications and transmit that the retrieved image to the messaging client 305, as previously discussed.

Other protection provided by the dynamic message system 216 may comprise the use of a signature to determine whether the image request is coming from the intended original recipient or from some other user. In some example embodiments, the message transmitted to the messaging client 305 of the computing device of the user comprises a signature, and the dynamic message system 216 receives an image request from another messaging client 305 of another computing device of another user (e.g., not the intended original recipient user). The other image request comprises an image URL that would be included in an image request from the intended original recipient user, as well as the signature. In some example embodiments, the dynamic message system 216 stores a signature in association with the message transmitted by the dynamic message system 216 to the messaging client 305, and is configured to, in response to or otherwise based on receiving the image request, determine that the other signature does not match the signature of the message. In response to the determination that the other signature does not match the signature of the message, the dynamic message system 216 retrieves a default image not based on any value of the count of notifications and not indicating any value of the count of notifications, and then transmits the retrieved default image to the other messaging client 305 for display on the other computing device of the other user.

Figure 4:
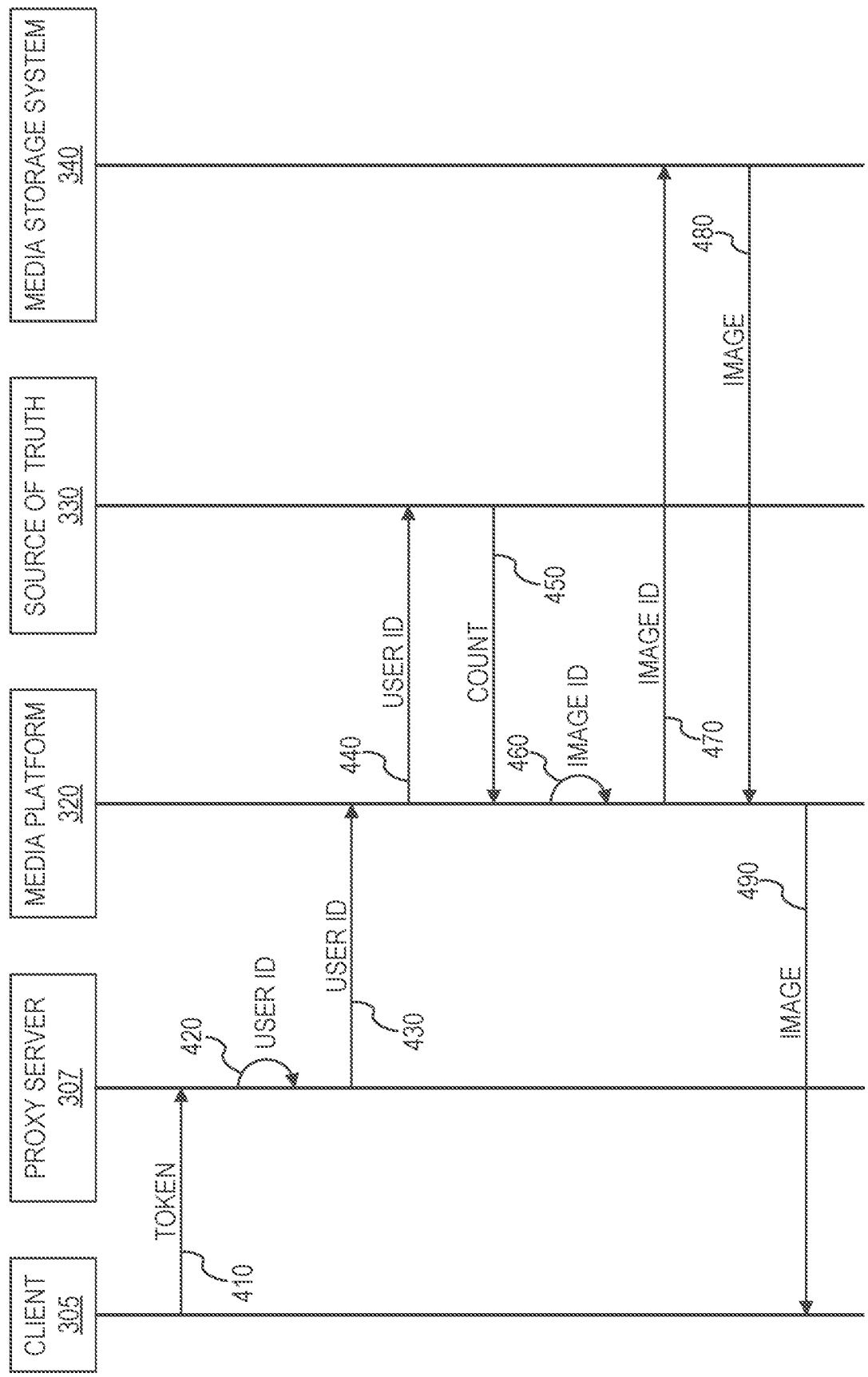
FIG. 4 is a sequence diagram illustrating operations for providing dynamic and secure real-time notifications in messages, in accordance with an example embodiment.

FIG. 4 is a sequence diagram illustrating operations for providing dynamic and secure real-time notifications in messages, in accordance with an example embodiment. The operations in FIG. 4 are performed after a message has been generated by the content generation module 310, transmitted to the messaging client 305, and opened within the messaging client 305 after a change in the current value of the count of notifications has occurred since the transmission of the message to the messaging client 305.

At operation 410, the messaging client transmits an image request comprising a token to the proxy server 307. At operation 420, the proxy server 307 decrypts the token to generate a user ID. At operation 430, the proxy server 307 transmits the user ID to the media platform module 320. At operation 440, the media platform module 320 transmits the user ID to the SOT module 330 as part of a query for the current value of the count of notifications. At operation 450, the SOT module 330 retrieves the current value of the count of notifications based on the user ID, and transmits the current value of the count to the media platform module 320. At operation 450, the media platform module 320 retrieves an image ID based on the current value of the count of notifications. At operation 470, the media platform module 320 transmits the image ID to the media storage system 340 as part of a query for an image. At operation 480, the media storage system 340 retrieves the image based on the image ID, and transmits the image to the media platform module 320. At operation 490, the media platform module 320 transmits the image to the messaging client 305 for display in the opened message.

It is contemplated that any of the other features described within the present disclosure can be incorporated into the sequence diagram of FIG. 4, whether it is before, during, or after any of the operations 410, 420, 430, 440, 450, 460, 470, 480, 480, and 490.

Figure 5A:
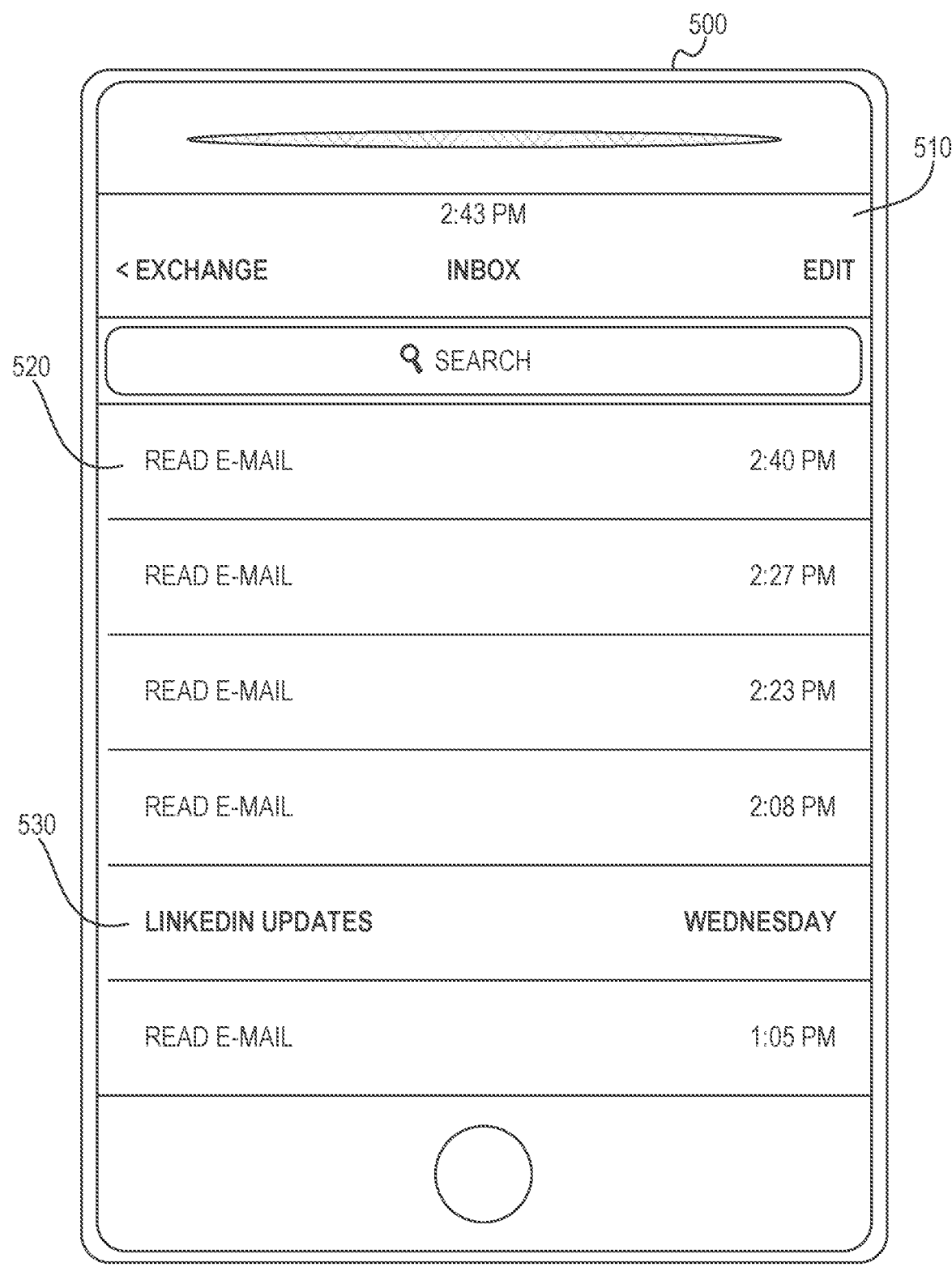
FIGS. 5A-5B illustrate a mobile device having a graphical user interface (GUI) in which a dynamic and secure real-time notification is provided in a message, in accordance with an example embodiment.
Figure 5B:
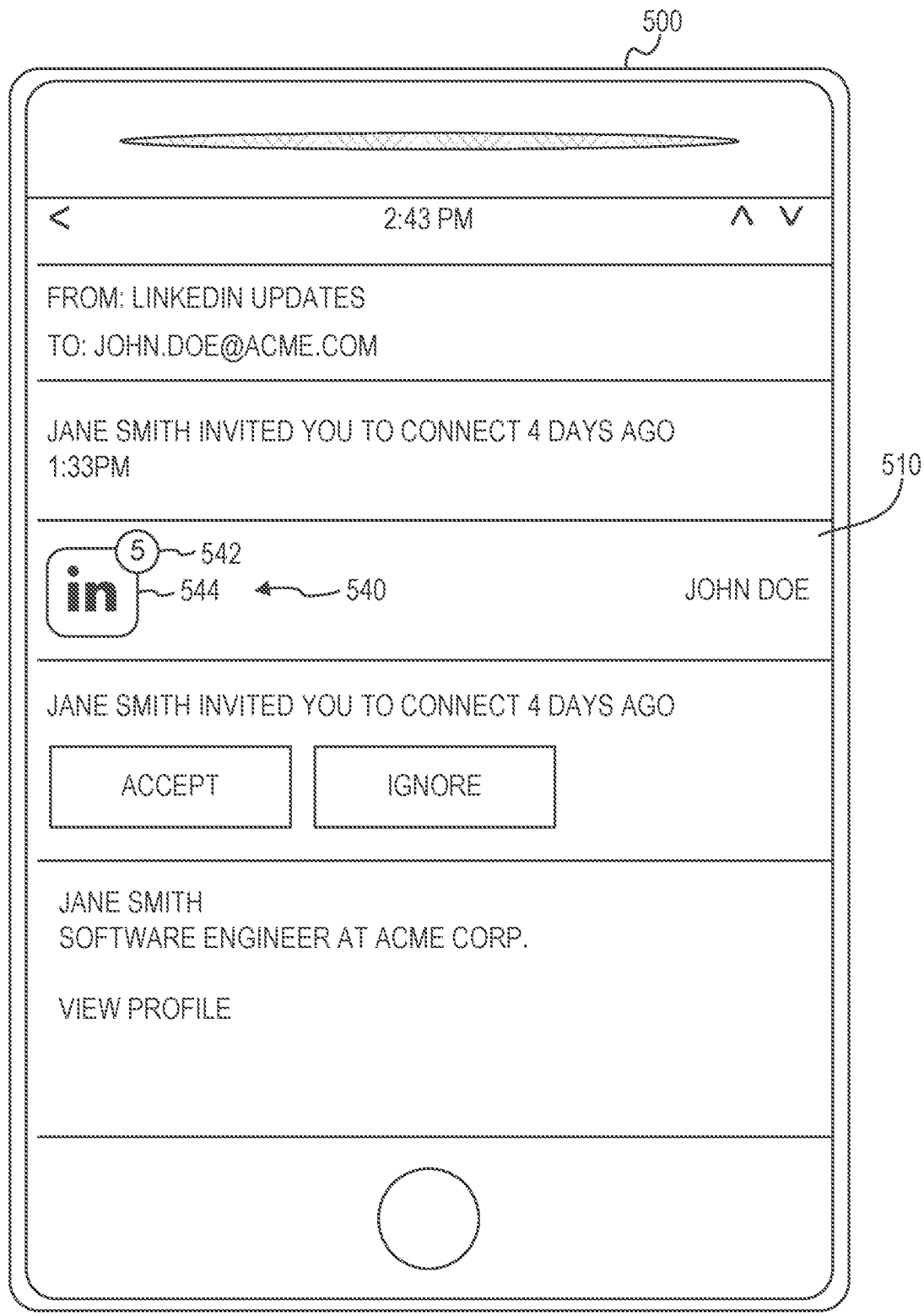

FIGS. 5A-5B illustrate a mobile device 500 having a graphical user interface (GUI) 510 in which a dynamic and secure real-time notification is provided in a message, in accordance with an example embodiment. In FIG. 5A, a user has opened the messaging client 305 on the mobile device, resulting in a list of messages being displayed. The list of messages may include messages 520 that have been opened and viewed by the user and messages 530 that have not been opened and viewed by the user. In one example shown in FIG. 5A, it may have been a few days since the message 530 labelled "LINKEDIN UPDATES" was transmitted to the server of the messaging client 305. In situations in which the features of dynamic message system 216 are not employed, content within the message 530, which may include an indication of the count of notifications associated with the user on an online service, may have gone stale and be out-of-date due to computing events that have occurred since the message 530 was originally transmitted to the server of the messaging client 305. However, as previously discussed, the dynamic message system 216 solves this problem by transmitting, at the time the message is opened within the messaging client 305, an image that corresponds to the most current data on which the content is to be based to the server of the messaging client 305 for display in the message.

In FIG. 5B, the message 530 has been opened by the user within the messaging client 305. As seen in FIG. 5B, instead of displaying text that is meant to indicate the number of notifications associated with the user, the dynamic message system 216 causes an image 540 (e.g., the image retrieved by the dynamic message system 216 based on the current value of the count of notifications) indicating the number of notifications to be displayed. In some example embodiments, the image 540 may comprise different components, such as a default logo 544 of the online service that issues the notifications and a count image 542 indicating the current value of the count of notifications as of the time the message was opened by the user. It is contemplated that other types and forms of the image 540 may be used as well, in accordance with some embodiments of the present disclosure.

Figure 6:
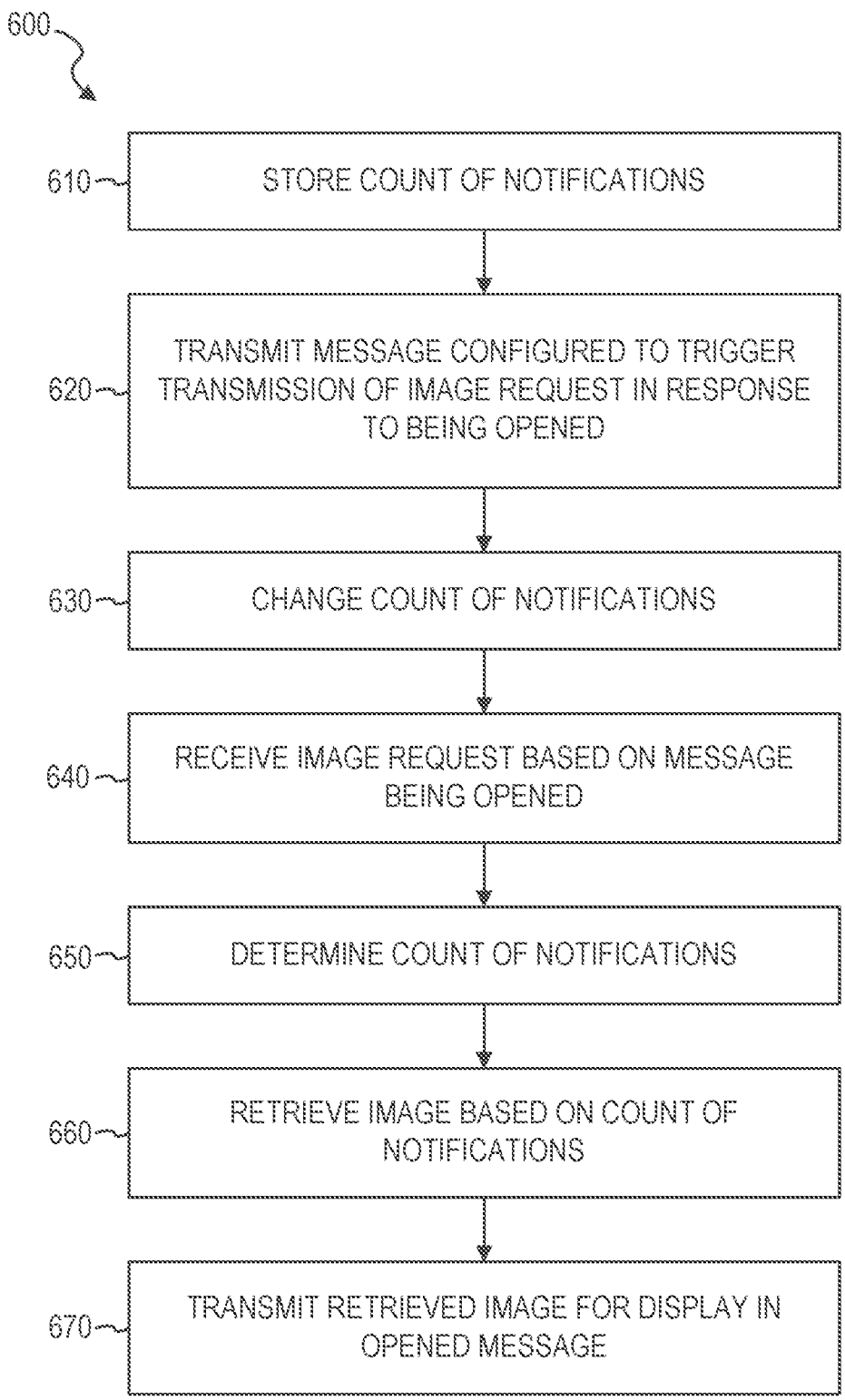
FIG. 6 is a flowchart illustrating a method of providing dynamic and secure real-time notifications in messages, in accordance with an example embodiment.

FIG. 6 is a flowchart illustrating a method 600 of providing dynamic and secure real-time notifications in messages, in accordance with an example embodiment. The method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the dynamic message system 216 of FIGS. 2-3, or any combination of one or more of its modules, as described above.

At operation 610, the dynamic message system 216 stores a count of notifications associated with a user of an online service. In some example embodiments, the online service comprises a social networking service. However, other types of online services are also within the scope of the present disclosure. In some example embodiments, the notifications comprise at least one of: one or more notifications of an invitation to connect with another user via the online service; one OF more reminders to perform an action via the online service; one or more notifications of messages sent to the user via the online service; one or more notifications of job opportunities; and one or more notifications about one or more other users of the online service with whom the user is connected via the online service. However, other types of notifications are also within the scope of the present disclosure. In some example embodiments, the count of notifications comprises a count of notifications that have not been opened or viewed by the user.

At operation 620, the dynamic message system 216 transmits a message to a messaging client of a computing device of the user via a network. In some example embodiments, the messaging client comprises an e-mail client and the message comprises an e-mail message. However, other types of messages and messaging clients are also within the scope of the present disclosure. At the time the message is transmitted, the count of notifications is at a first value. In some example embodiments, the message is configured to trigger the messaging client to transmit an image request to the dynamic message system 216 in response to the message being opened.

At operation 630, the dynamic message system 216, subsequent to transmitting the message to the messaging client, changes the count of notifications from the first value to a second value different from the first value. The change may comprise increasing the value or decreasing the value. In some example embodiments, the change in the count of the notifications is performed in response to, or otherwise based on, one or more computing events being performed on the online service.

At operation 640, the dynamic message system 216 receive the image request from the messaging client based on the message having been opened within the messaging client. At operation 650, the dynamic message system 216 determines the count of notifications to be the second value in response to, or otherwise based on, receiving the image request. At operation 660, the dynamic message system 216 retrieves an image from a database of images based on the second value of the count of notifications. In some example embodiments, the image indicates the second value of the count of notifications. At operation 670, the dynamic message system 216 transmits the retrieved image to the messaging client for display in the opened message.

In some example embodiments, the message comprises code configured to cause a messaging server of the messaging client to retrieve the image from the dynamic message system 216 every time the message is opened within the messaging client and not from a cache of the messaging server. In some example embodiments, the code comprises an image URL and at least one query parameter.

It is contemplated that any of the other features described within the present disclosure can be incorporated into the method 600.

Figure 7:
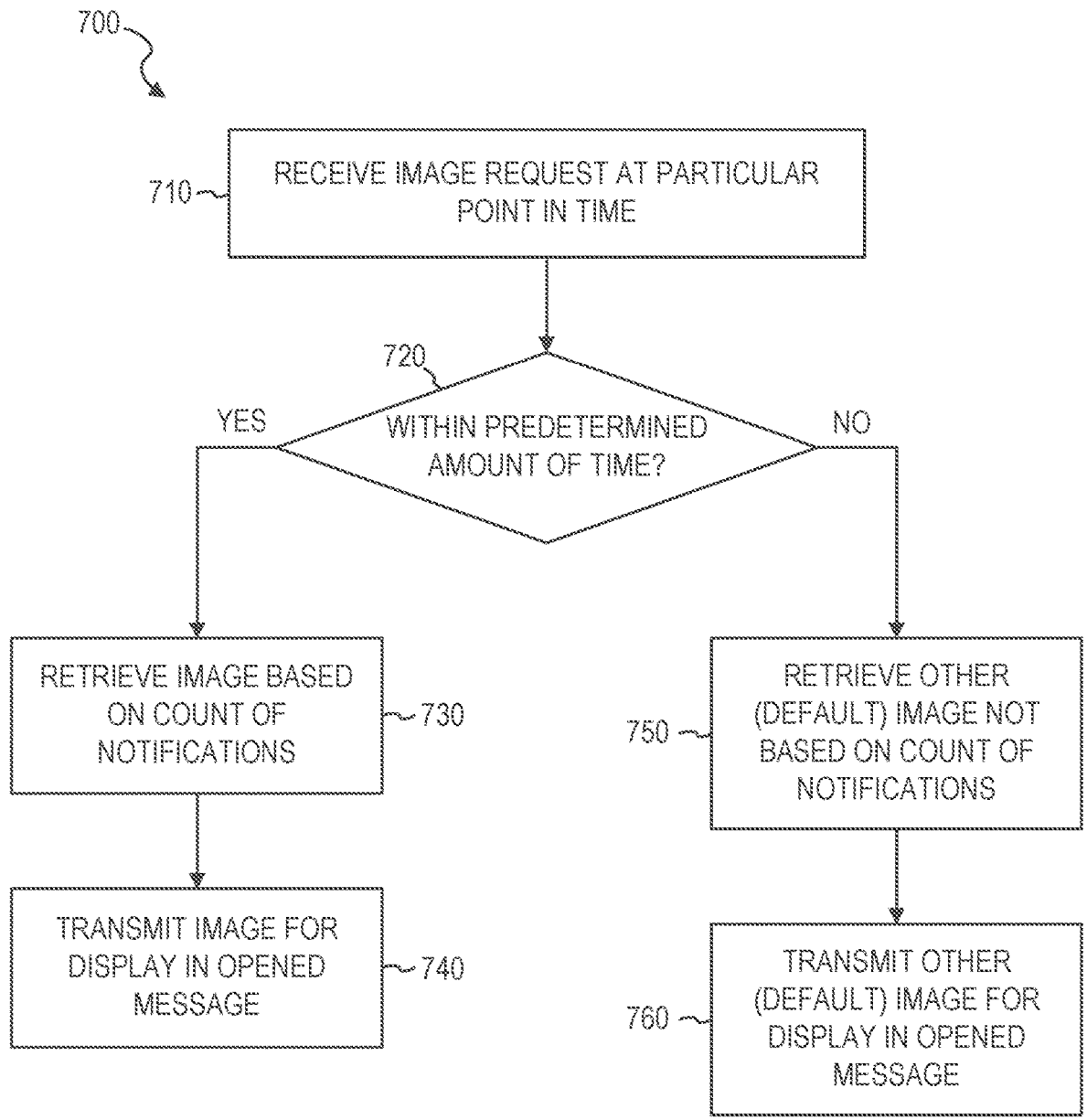
FIG. 7 is a flowchart illustrating another method of providing dynamic and secure real-time notifications in messages, in accordance with an example embodiment.

FIG. 7 is a flowchart illustrating another method 700 of providing dynamic and secure real-time notifications in messages, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the dynamic message system 216 of FIGS. 2-3, or any combination of one or more of its modules, as described above.

At operation 710, the dynamic message system 216 receives, at a particular point in time, an image request from a messaging client of a computing device of a user. In some example embodiments where the user is a different user than the intended original recipient of the message, the image request received at operation 710 is a different image request than an image request from the intended original recipient of the message, although it would include the same image URL that would be included in an image request from the intended original recipient. At operation 720, the dynamic message system 216 determines whether or not the particular point in time at which the image request was received is within a predetermined amount of time since the message was transmitted to the messaging client.

If, at operation 720, it is determined that the particular point in time is within the predetermined amount of time, then the dynamic message system 216 retrieves an image from the database of images based on a value of the count of notifications, at operation 730, with the image indicating the value of the count of notifications, and then transmits the retrieved image to the messaging client for display on the computing device of the user, at operation 740.

If, at operation 720, it is determined that the particular point in time is not within the predetermined amount of time, then the dynamic message system 216 retrieves another image from the database of images not based on any value of the count of notifications, at operation 750, with the other image not indicating any value of the count of notifications, and then transmits the retrieved other image to the other messaging client for display on the other computing device of the other user at operation 760.

It is contemplated that any of the other features described within the present disclosure can be incorporated into the method 700.

Figure 8:
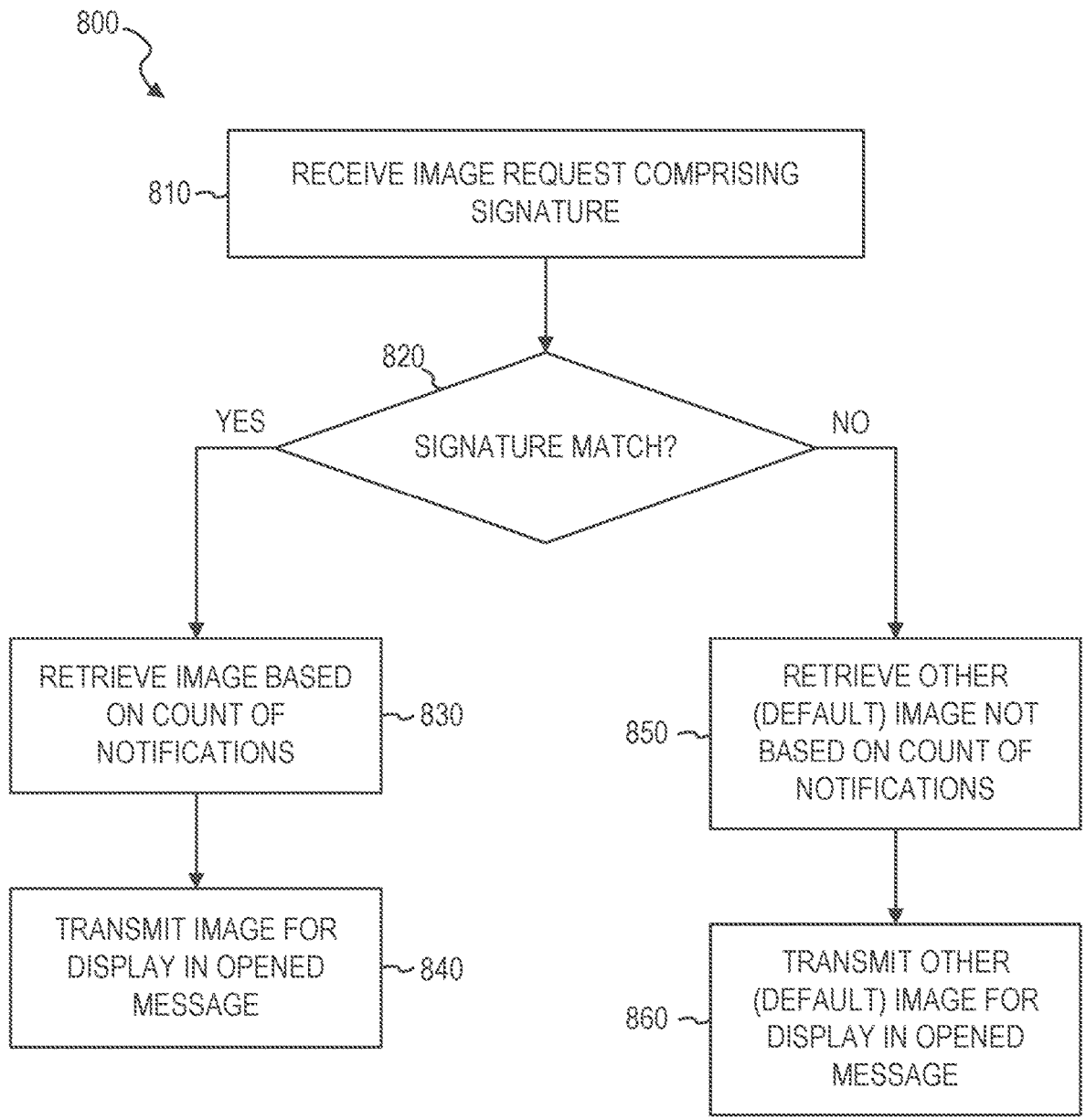
FIG. 8 is a flowchart illustrating yet another method of providing dynamic and secure real-time notifications in messages, in accordance with an example embodiment.

FIG. 8 is a flowchart illustrating yet another method 800 of providing dynamic and secure real-time notifications is messages, in accordance with an example embodiment. The method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the dynamic message system 216 of FIGS. 2-3, or any combination of one or more of its modules, as described above.

At operation 810, the dynamic message system 216 receives an image request from a messaging client of a computing device of a user. In some example embodiments where the user is a different user than the intended original recipient of the message, the image request received at operation 810 is a different image request than an image request from the intended original recipient of the message and would include a different signature than a signature associated with the message transmitted to the intended original recipient, although it would include the same image URL that would be included in an image request from the intended original recipient. At operation 820, the dynamic message system 216 determines whether or not signature in the image request matches the signature of the message.

If, at operation 820, it is determined that the signature in the image request matches the signature of the message, then the dynamic message system 216 retrieves an image from the database of images based on a value of the count of notifications, at operation 830, with the image indicating the value of the count of notifications, and then transmits the retrieved image to the messaging client for display on the computing device of the user, at operation 840.

If, at operation 820, it is determined that the signature in the image request does not match the signature of the message, then the dynamic message system 216 retrieves another image from the database of images not based on any value of the count of notifications, at operation 850, with the other image not indicating any value of the count of notifications, and then transmits the retrieved other image to the other messaging client for display on the other computing device of the other user, at operation 860.

It is contemplated that any of the other features described within the present disclosure can be incorporated into the method 800.

Example Mobile Device

Figure 9:
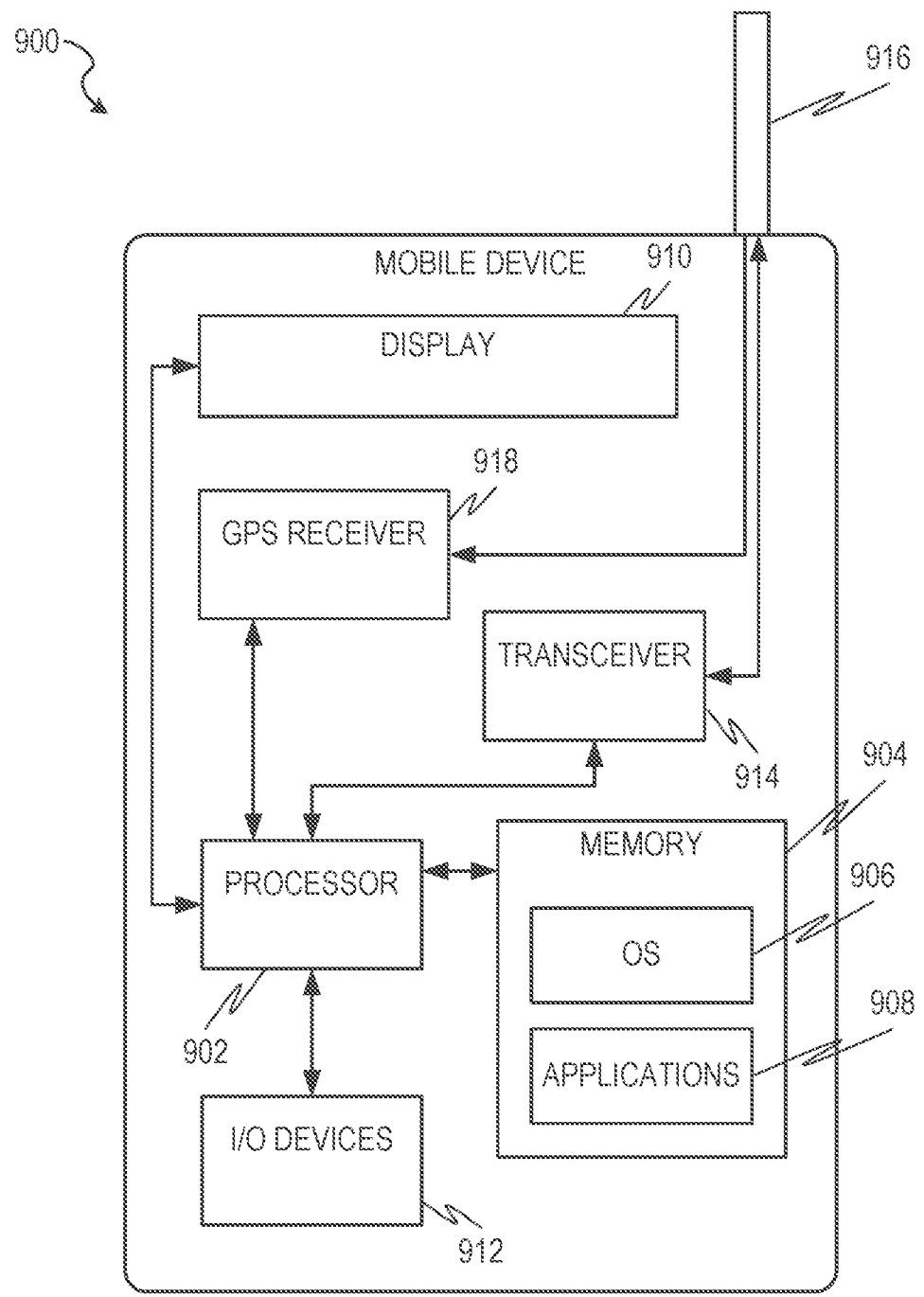
FIG. 9 is a block diagram illustrating a mobile device, in accordance with some example embodiments.

FIG. 9 is a block diagram illustrating a mobile device 900, according to an example embodiment. The mobile device 900 can include a processor 902. The processor 902 can be any of a variety of different types of commercially available processors suitable for mobile devices 900 for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location-enabled application that can provide location-based services (LBSs) to a user. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
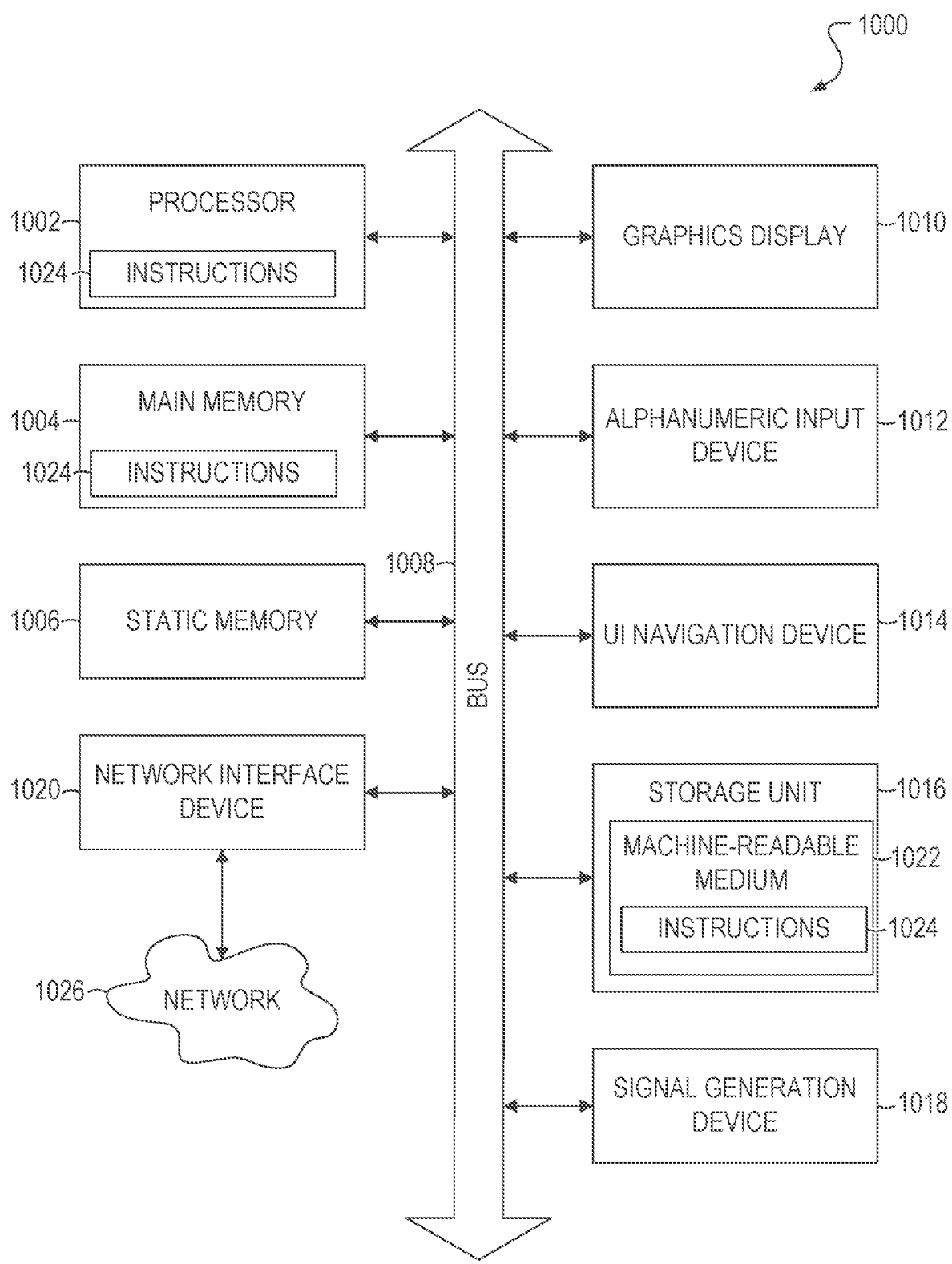
FIG. 10 is a block diagram of an example computer system on which methodologies described herein may be executed, in accordance with an example embodiment.

FIG. 10 is a block diagram of an example computer system 1000 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (SIB), a Personal Digital Assistant (PDA), a cellular telephone, a web appliance, a network router, switch or bridge, or an machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a graphics display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a storage unit 1016, a signal generation device 1018 (e.g., a speaker) and a network interface device 1020.

Machine-Readable Medium

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions (e.g., instructions 1024) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP).

Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments ma be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    storing, by a computer system having a memory and at least one hardware processor, a count of notifications associated with a user of an online service;
    transmitting, by the computer system, a message to a messaging client of a computing device of the user via a network, the message being configured to trigger the messaging client to transmit an image request to the computer system in response to the message being opened, the count of notifications being at a first value when the message is transmitted to the messaging client;
    subsequent to transmitting the message to the messaging client, changing, by the computer system, the count of notifications from the first value to a second value different from the first value;
    receiving, by the computer system, the image request from the messaging client based on the message having been opened within the messaging client;
    in response to receiving the image request, determining, by the computer system, the count of notifications to be the second value;
    retrieving, by the computer system, an image from a database of images based on the second value of the count of notifications, the database of images comprising a plurality of images, each one of the plurality of images comprising a different number that indicates a different value of the count of notifications, the retrieved image comprising a number that indicates the second value of the count of notifications; and
    transmitting, by the computer system, the retrieved image to the messaging client for display in the opened message.

2. The computer-implemented method of claim 1, wherein the message comprises code configured to cause a messaging server of the messaging client to retrieve the image from the computer system every time the message is opened within the messaging client and not from a cache of the messaging server.

3. The computer-implemented method of claim 2, wherein the code comprises an image Uniform Resource Locator (URL) and at least one query parameter.

4. The computer-implemented method of claim 1, further comprising:
    receiving, at a particular point in time, another image request from another messaging client of another computing device of another user, the other image request comprising an image URL included in the image request;
    in response to receiving the other image request, determining that the particular point in time is not within a predetermined amount of time since the message was transmitted to the messaging client;
    retrieving another image from the database of images not based on any value of the count of notifications, the other image not indicating any value of the count of notifications; and
    transmitting the retrieved other image to the other messaging client for display on the other computing device of the other user.

5. The computer-implemented method of claim 1, wherein the message transmitted to the messaging client of the computing device of the user comprises a signature, and the method further comprises:
    receiving another image request from another messaging client of another computing device of another user, the other image request comprising an image URL included in the image request and another signature;
    in response to receiving the other image request, determining that the other signature does not match the signature of the message;
    in response to the determining that the other signature does not match the signature of the message, retrieving another image from the database of images not based on any value of the count of notifications, the other image not indicating any value of the count of notifications; and
    transmitting the retrieved other image to the other messaging client for display on the other computing device of the other user.

6. The computer-implemented method of claim 1, wherein the messaging client comprises an e-mail client and the message comprises an e-mail message.

7. The computer-implemented method of claim 1, wherein the count of notifications comprises a count of notification messages that have not been opened by the user.

8. The computer-implemented method of claim 1, wherein the notifications comprise at least one of:
    one or more notifications of an invitation to connect with another user via the online service;
    one or more reminders to perform an action via the online service;
    one or more notifications of messages sent to the user via the online service;
    one or more notifications of job opportunities; and one or more notifications about one or more other users of the online service with whom the user is connected via the online service.

9. A system comprising:
at least one hardware processor; and
a non-transitory machine-readable medium embodying a set of instructions that, when executed by the at least one hardware processor, cause the at least one processor to perform operations, the operations comprising:
storing a count of notifications associated with a user of an online service;
transmitting a message to a messaging client of a computing device of the user via a network, the message being configured to trigger the messaging client to transmit an image request to the at least one hardware processor in response to the message being opened, the count of notifications being at a first value when the message is transmitted to the messaging client;
subsequent to transmitting the message to the messaging client, changing the count of notifications from the first value to a second value different from the first value;
receiving the image request from the messaging client based on the message having been opened within the messaging client;
in response to receiving the image request, determining the count of notifications to be the second value;
retrieving an image from a database of images based on the second value of the count of notifications, the database of images comprising a plurality of images, each one of the plurality of images comprising a different number that indicates a different value of the count of notifications, the retrieved image comprising a number that indicates the second value of the count of notifications; and
transmitting the retrieved image to the messaging client for display in the opened message.

10. The system of claim 9, wherein the message comprises code configured to cause a messaging server of the messaging client to retrieve the image from the computer system every time the message is opened within the messaging client and not from a cache of the messaging server.

11. The system of claim 10, wherein the code comprises an image Uniform Resource Locator (URL) and at least one query parameter.

12. The system of claim 9, wherein the operations further comprise:
receiving, at a particular point in time, another image request from another messaging client of another computing device of another user, the other image request comprising an image URL included in the image request;
in response to receiving the other image request, determining that the particular point in time is not within a predetermined amount of time since the message was transmitted to the messaging client;
retrieving another image from the database of images not based on any value of the count of notifications, the other image not indicating any value of the count of notifications; and
transmitting the retrieved other image to the other messaging client for display on the other computing device of the other user.

13. The system of claim 9, wherein the message transmitted to the messaging client of the computing device of the user comprises a signature, and the operations further comprise:
receiving another image request from another messaging client of another computing device of another user, the other image request comprising an image URL included in the image request and another signature;
in response to receiving the other image request, determining that the other signature does not match the signature of the message;
in response to the determining that the other signature does not match the signature of the message, retrieving another image from the database of images not based on any value of the count of notifications, the other image not indicating any value of the count of notifications; and
transmitting the retrieved other image to the other messaging client for display on the other computing device of the other user.

14. The system of claim 9, wherein the messaging client comprises an e-mail client and the message comprises an e-mail message.

15. The system of claim 9, wherein the count of notifications comprises a count of notification messages that have not been opened by the user.

16. The system of claim 9, wherein the notifications comprise at least one of:
one or more notifications of an invitation to connect with another user via the online service;
one or more reminders to perform an action via the online service;
one or more notifications of messages sent to the user via the online service;
one or more notifications of job opportunities; and
one or more notifications about one or more other users of the online service with whom the user is connected via the online service.

17. A non-transitory machine-readable medium embodying a set of instructions that, when executed by at least one hardware processor, cause the processor to perform operations, the operations comprising:
storing a count of notifications associated with a user of an online service;
transmitting a message to a messaging client of a computing device of the user via a network, the message being configured to trigger the messaging client to transmit an image request to the at least one processor in response to the message being opened, the count of notifications being at a first value when the message is transmitted to the messaging client;
subsequent to transmitting the message to the messaging client, changing the count of notifications from the first value to a second value different from the first value;
receiving the image request from the messaging client based on the message having been opened within the messaging client;
in response to receiving the image request, determining the count of notifications to be the second value;
retrieving an image from a database of images based on the second value of the count of notifications, the database of images comprising a plurality of images, each one of the plurality of images comprising a different number that indicates a different value of the count of notifications, the retrieved image comprising a number that indicates the second value of the count of notifications; and transmitting the retrieved image to the messaging client for display in the opened message.

18. The non-transitory machine-readable medium of claim 17, wherein the message comprises code configured to cause a messaging server of the messaging client to retrieve the image from the computer system every time the message is opened within the messaging client and not from a cache of the messaging server.

19. The non-transitory machine-readable medium of claim 18, wherein the code comprises an image Uniform Resource Locator (URL) and a query parameter.

20. The non-transitory machine-readable medium of claim 17, wherein the operations further comprise:
- receiving, at a particular point in time, another image request from another messaging client of another computing device of another user, the other image request comprising an image URL included in the image request;
- in response to receiving the other image request, determining that the particular point in time is not within a predetermined amount of time since the message was transmitted to the messaging client;
- retrieving another image from the database of images not based on any value of the count of notifications, the other image not indicating any value of the count of notifications; and
- transmitting the retrieved other image to the other messaging client for display on the other computing device of the other user.

* * * * *